(12) United States Patent
Draper et al.

(10) Patent No.: US 8,968,430 B2
(45) Date of Patent: Mar. 3, 2015

(54) DEWATERING SYSTEM AND PROCESS FOR INCREASING THE COMBINED CYCLE EFFICIENCY OF A COAL POWERPLANT

(75) Inventors: Samuel David Draper, Simpsonville, SC (US); David Matthew Polizzotti, Yardley, PA (US); Chandrashekhar Ganpatrao Sonwane, Greenville, SC (US)

(73) Assignee: General Electric Company, Schenectady, NY (US)

( * ) Notice: Subject to any disclaimer, the term of this patent is extended or adjusted under 35 U.S.C. 154(b) by 631 days.

(21) Appl. No.: 12/395,225

(22) Filed: Feb. 27, 2009

(65) Prior Publication Data

US 2010/0218477 A1    Sep. 2, 2010

(51) Int. Cl.
| C10L 9/02 | (2006.01) |
| C02F 1/44 | (2006.01) |
| C10L 9/06 | (2006.01) |

(52) U.S. Cl.
CPC . *C10L 9/06* (2013.01); *C02F 1/441* (2013.01); *Y02E 20/16* (2013.01)
USPC .............................................. 44/626; 44/627

(58) Field of Classification Search
USPC .................................................. 44/626, 627
See application file for complete search history.

(56) References Cited

U.S. PATENT DOCUMENTS

| 4,424,062 A | 1/1984 | Kamino et al. | |
| 4,743,271 A | 5/1988 | Kindig et al. | |
| 4,804,390 A * | 2/1989 | Lloyd et al. ................. | 44/621 |
| 6,338,803 B1 | 1/2002 | Campbell et al. | |
| 7,090,780 B2 * | 8/2006 | Ito et al. ..................... | 210/764 |
| 2003/0160003 A1* | 8/2003 | Maree ......................... | 210/724 |
| 2003/0173296 A1* | 9/2003 | Costa et al. ................ | 210/639 |
| 2007/0045189 A1 | 3/2007 | Lichtner et al. | |

FOREIGN PATENT DOCUMENTS

| CN | 101248013 A | 8/2008 |
| CN | 101274786 A | 10/2008 |
| DE | 3803905 A1 | 8/1989 |
| EP | 0016624 A1 | 10/1980 |
| JP | S5376173 A | 7/1978 |

(Continued)

OTHER PUBLICATIONS

Cara, J., et al., "Biodesulphurisation of High Sulphur Coal by Heap Leaching"; Fuel, IPC Science and Technology Press, Guildford, GB LNKD.; DOI: 10.1016/J.Fuel.2005.03.012, vol. 84, No. 14-15, Oct. 1, 2005, pp. 1905-1910, XP004952919; ISSN: 0016-2361.

(Continued)

*Primary Examiner* — James Goloboy
(74) *Attorney, Agent, or Firm* — Cantor Colburn LLP

(57) ABSTRACT

A process for treating coal includes contacting the coal with a leaching agent configured to remove a mineral from the coal; forming a wastewater stream comprising water and a concentration of a contaminant; and contacting the wastewater stream with a first side of a reverse osmosis membrane under pressure, wherein a permeate stream comprising a reduced concentration of the contaminant permeates the reverse osmosis membrane and flows from a second side of the reverse osmosis membrane, and a concentrate stream comprising an increased concentration of the contaminant is retained on the first side of the reverse osmosis membrane.

14 Claims, 3 Drawing Sheets

(56) References Cited

FOREIGN PATENT DOCUMENTS

| JP | S55133487 A | 10/1980 |
|----|-------------|---------|
| JP | S57162791 A | 10/1982 |
| JP | S62132704 A | 6/1987 |
| JP | H03502464 A | 6/1991 |

OTHER PUBLICATIONS

Sakanishi, Kinya, et al., "Characterization of Eluted Metal Components From Coal During Pretreatment and Solvent Extraction"; Fuel, IPC Science and Technology Press, Guildford, GB LNKD; DOI:10.1016/J.Fuel.2003.08.022; vol. 83, No. 6; Apr. 1, 2004; pp. 739-743; XP004490306; ISSN: 0016-2361.

EP Search Report for EP Application No. 10154483.1. Mailing Date Jun. 16, 2010.

Yoshida, T., et al, "The Effect of Extracton Condition on 'Hypercoal' Production (1)—Under Room-Temperature Filtration"; Fuel, IPC Science and Technology Press, Guildford, GB LNKD; DOI:10.1016/S0016-2361(01)00068-6; vol. 81, No. 11-12; Jul. 8, 2002, pp. 1463-1469; XP004354921; ISSN: 0016-2361.

Steel, Karen M., et al., "The Production of Ultra Clean Coal by Chemical Demineralisation"; Fuel, IPC Science and Technology Press, Guildford, GB LNKD; DOI:10.1016/S0016-2361(01)00092-8, vol. 80, No. 14; Nov. 1, 2001, pp. 2019-2023; XP004320168; ISSN: 0016-2361.

Steel et al., "Production of Ultra Clean Coal Part I—Ionic Equilibria in Solution When Mineral Matter From Black Coal Is Treated With Aqueous Hydrofluoric Acid", Fuel Processing Technology 70 (2001) pp. 171-192.

Steel et al., "Production of Ultra Clean Coal Part II—Ionic Equilibria in Solution When Mineral Matter From Black Coal Is Treated With Aqueous Hydrofluoric Acid", Fuel Processing Technology 70 (2001) pp. 193-219.

Steel et al., "The Production of Ultra Clean Coal by Sequential Leaching With HG Followed by HNO3", Science Direct, Fuel 82 (2003) pp. 1917-1920.

Wu et al., Demineralization of a UK Bituminous Coal Using HF and Ferric Ions, Science Direct, Fuel 86 (2007) pp. 2194-2200.

Office Action and Search Report from CN Application No. 201010131521.2 dated Oct. 12, 2013, along with unofficial English translation.

Office Action and Search Report from CN Application No. 201010131521.2 dated Apr. 12, 2013.

J. Cara, et al, Biodesulphurisation of high sulphur coal by heap leaching, vol. 84, p. 1905-1909, May 3, 2005.

EP Office Action for EP Application No. 10154483.1. Mailing date Jan. 20, 2012 (5 pgs).

EP Office Action for EP Application No. 10154483.1. Mailed Feb. 13, 2013 (4 pgs).

Unofficial English translation of JP Office Action issued May 20, 2014 in connection with corresponding JP Patent Application No. 2010-034186.

EP Decision to Refuse the Application; EP Application No. 10154483.1; Mail Date Oct. 10, 2014 (17 pages).

* cited by examiner

DEWATERING SYSTEM AND PROCESS FOR INCREASING THE COMBINED CYCLE EFFICIENCY OF A COAL POWERPLANT

BACKGROUND OF THE INVENTION

This disclosure relates generally to coal power plants, and more particularly to coal power plants having increased combined cycle efficiency.

The efficiency of burning coal to generate electricity can be increased through the utilization of coal turbines. Various minerals in the coal such as, but not limited to, inorganic minerals, however, should be removed to prevent damage to the turbine blades and other system components. The minerals, therefore, are removed either before combustion or after combustion, but prior to the combustion gas entering the turbine. In the former approach, the inorganic mineral content of the coal is reduced to less than about 0.1 weight percent (wt %). Coal of this purity is referred to as ultra clean coal (UCC). UCC can also be utilized as a raw material for the production of a vast array of useful organic compounds and polymers.

The inorganic minerals present in the coal will depend on the coal's source, and can include kaolinite, quartz, clay, such as chlorite and montmorillonite, pyrite, anatase titanium dioxide, and siderate. The inorganic minerals can also include hematite, natrojarosite, dolomite, apatite, flourapatite, feldspar, and gypsum.

One method of producing UCC is by leaching out the minerals by washing the coal with leaching agents, such as strong acids. Methods for leaching to produce clean coal are well known. Examples of leaching agents include hydrofluoric acid, nitric acid, and ferric nitrate. In a specific method, the coal is leached first with an aqueous solution of hydrofluoric acid, then with an aqueous solution of nitric acid or ferric nitrate. Leaching of coal with an aqueous solution of hydrofluoric acid is referred to herein as fluoride treatment.

The spent leaching solution not only contains hydrofluoric acid, nitric acid, or ferric nitrate, but also the minerals leached out of the coal. The mineral impurities present in the coal are dissolved by the leaching agents, thereby releasing silicon, aluminum, iron, titanium, potassium, calcium, sodium, magnesium, barium, strontium, vanadium, copper, manganese, zirconium, zinc, cerium, or a combination comprising at least one of the foregoing elements into the leaching agent solution. The elements and amount of elements released into the leaching agent solution depend upon the source of the coal and the mineral content therein.

The spent leaching solution is a wastewater stream, which should not be released directly into the environment without treatment. One way of treating this wastewater is to boil off the water, and landfill the solid residue. However, coal turbine plants suffer an energy efficiency penalty for boiling off the water from the wastewater. Including the energy to boil off the water, the combined cycle efficiency of a coal turbine plant, which can be measured in terms of higher heating value (HHV), is only about 33%. Such a low efficiency makes burning UCC for power both environmentally and economically undesirable.

An improved method for treating the wastewater streams of coal cleaning processes is desirable. Specifically, it would be advantageous to have a method to remove water from the wastewater without suffering the energy efficiency penalty associated with boiling the water.

BRIEF DESCRIPTION OF THE INVENTION

According to one aspect of the invention, a process for treating coal includes contacting the coal with a leaching agent configured to remove a mineral from the coal, forming a wastewater stream comprising water and a concentration of a contaminant; and contacting the wastewater stream with a first side of a reverse osmosis membrane under pressure, wherein a permeate stream comprising a reduced concentration of the contaminant permeates the reverse osmosis membrane and flows from a second side of the reverse osmosis membrane, and a concentrate stream comprising an increased concentration of the contaminant is retained on the first side of the reverse osmosis membrane.

According to another aspect of the invention, a coal treatment system includes an advanced coal treatment stage configured to produce ultra clean coal, wherein the stage comprises a leaching agent treatment system configured to remove a mineral from the coal and form a wastewater stream; and a dewatering system in fluid communication with the leaching agent treatment system and configured to reduce a concentration of a contaminant in the wastewater stream, wherein the dewatering system comprises a reverse osmosis membrane in fluid communication with the wastewater stream.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
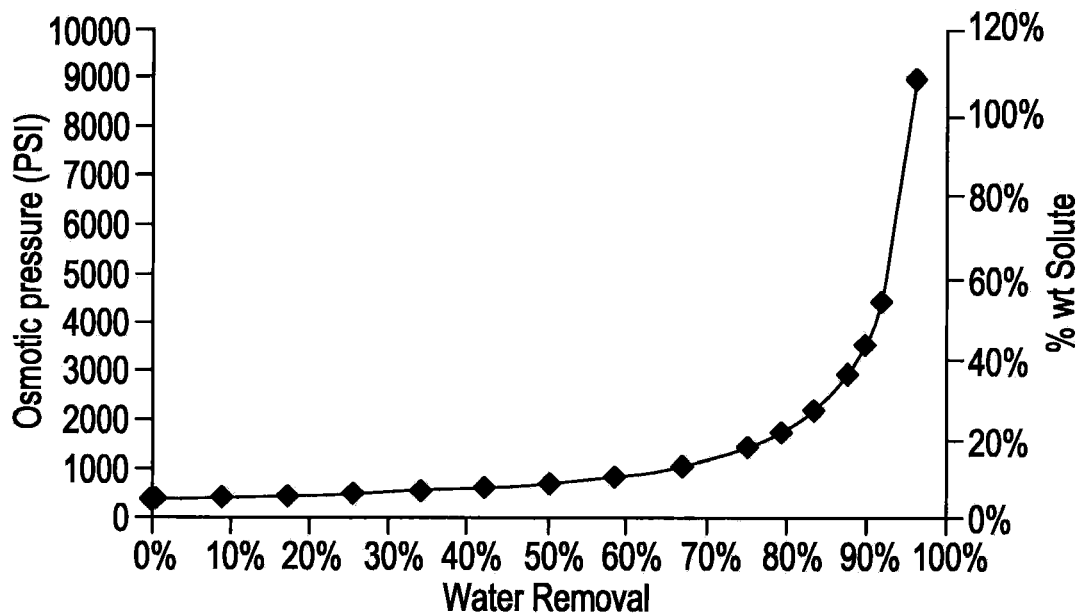
FIG. 1 is a plot of combined cycle efficiency in units of higher heating value versus water multiple of solute.

The detailed description explains embodiments of the invention, together with advantages and features, by way of example with reference to the drawings.

DETAILED DESCRIPTION OF THE INVENTION

Disclosed herein is a system and process for increasing the combined cycle (CC) efficiency of a coal power plant, specifically disclosed is a dewatering system and process that reduces the efficiency penalty incurred when water is removed from the wastewater stream resulting from the coal cleaning process. The inventors hereof have unexpectedly found that wastewater from the fluoride cleaning of coal can be removed and the dissolved salts concentrated with a dewatering system utilizing reverse osmosis. This process can be effective in removing the water despite the low pH, extremely corrosive nature, and high total dissolved solids of the wastewater.

As mentioned above, the CC efficiency (HHV) of a coal turbine plant using ultra clean coal is adversely affected by the energy required to boil off the water from the wastewater generated in treatment to clean the coal. A highly efficient coal power plant is both economically and environmentally desirable. Specifically, a direct-fired gas turbine of near or greater than 50% efficiency, depending on turbine class, would reduce cost and the environmental impact of coal power plants. Coal cleaning with fluoride treatments before combustion is an important step in this process. To capture the dissolved salts from the wastewater stream for further processing, the water is currently removed by boiling and the solids concentrated. Boiling off the water, however, incurs a penalty of up to 17 points in CC efficiency. The dewatering method as disclosed herein can reduce the penalty to as low as 2 points in CC efficiency.

Accordingly, a process for treating coal in a coal turbine power plant includes contacting the coal with a leaching agent at a temperature and pressure and for a duration effective to remove a mineral from the coal, wherein a wastewater stream is formed comprising a concentration of a contaminant; and contacting the wastewater stream with a first side of a reverse osmosis membrane under pressure, wherein a permeate stream comprising a reduced concentration of the contaminant permeates the reverse osmosis membrane and flows from a second side of the reverse osmosis membrane, and a concentrate stream comprising an increased concentration of the contaminant is retained on the first side of the reverse osmosis membrane. The wastewater as it enters the reverse osmosis membrane can sometimes be referred to as the "feed".

The wastewater contaminants derived from the coal cleaning treatment leaching solutions can include, without limitation, hydrofluoric acid, nitric acid, ferric nitrate, or a combination comprising at least one of the foregoing leaching agents. The wastewater contaminants derived from the inorganic minerals leached out of the coal can include, without limitation, silicon, aluminum, iron, titanium, potassium, calcium, sodium, magnesium, barium, strontium, vanadium, copper, manganese, zirconium, zinc, cerium, or a combination comprising at least one of the foregoing elements. The type and amount of contaminants in the wastewater stream will depend upon the leaching agents used, the source of the coal, and the mineral content of the coal.

Specific contaminants concentrated by the removal of water through reverse osmosis can include hydrofluoric acid, fluoride, nitric acid, ferric nitrate, nitrate, silicon, aluminum, iron, or a combination comprising at least one of the foregoing contaminants. The silicon can be in the form of $SiO_2$, $Si(OH)_4$, $SiF^{3+}$, $SiF_2^{2+}$, $SiF_3^+$, $SiF_4$, $SiF6^{2-}$ or a combination comprising at least one of the foregoing silicon complexes, depending upon the pH and concentrations of silicon and fluorine in the wastewater. The aluminum can be in the form of $Al(OH)_3$, $AlF^{2+}$, $AlF_2^+$, $AlF_3$, $AlF_4^-$, $AlF_5^{2-}$, and $AlF_6^{3-}$, or a combination comprising at least one of the foregoing aluminum complexes, depending upon the pH and concentrations of aluminum and fluoride in the wastewater. The iron can be in the form of $Fe(OH)_3$, $FeF^{2+}$, $FeF_{2+}$, $FeF_3$, or a combination comprising at least one of the foregoing iron complexes. Any of these cationic complexes can be substituted with one or more hydroxide ligands, depending upon the charge of the cation.

The total dissolved solids concentration in the wastewater stream is about 10,000 milligrams per liter (mg/L) to about 60,000 mg/L before the dewatering process. The pH of the wastewater is about 0 to about 4. Before dewatering, the wastewater can have a widely varying concentration of different contaminants, including, without limitation, hydrofluoric acid, fluoride, nitric acid, ferric nitrate, nitrate, silicon, aluminum, or iron at a concentration of, for example, about 0.1 mg/L to about 100,000 mg/L.

In one embodiment, the pH of the wastewater stream is increased to about 4 to about 7, and the total dissolved solids concentration in the wastewater stream is reduced to about 0.1 mg/L to about 10,000 mg/L after the dewatering process. In other words, the reverse osmosis permeate can have a varying concentration of different contaminants, including, without limitation, hydrofluoric acid, fluoride, nitric acid, ferric nitrate, nitrate, silicon, aluminum, or iron at a concentration of, for example, about 0.1 mg/L to about 10,000 mg/L.

In one embodiment, the total dissolved solids concentration in the concentrate about 8,000 mg/L to about 500,000 mg/L after the dewatering process. In other words, the reverse osmosis concentrate can have a varying concentration of different contaminants, including, without limitation, hydrofluoric acid, fluoride, nitric acid, ferric nitrate, nitrate, silicon, aluminum, or iron at a concentration of, for example, about 8,000 mg/L to about 500,000 mg/L.

In one embodiment, the reverse osmosis membrane is an asymmetric membrane or a thin film composite membrane. An asymmetric membrane is cast from solution in one piece from a single polymer and comprises a thin, dense layer in contact with a thicker, porous supporting layer. For example, the thin, dense layer can have a thickness of about 0.2 micrometers, while the thicker, porous layer has a thickness greater than 0.2 micrometers. The dense layer is primarily responsible for the selective transport properties of the membrane (high selectivity for water, with rejection of dissolved solids, and high flux). The porous supporting layer imparts mechanical integrity and strength to the membrane. Flux is defined as the flow rate through the reverse osmosis membrane per unit area. Units of flux used herein are liter per hour per meter squared (L/hr $m^2$).

Alternatively, a thin film composite membrane includes two layers formed separately that can have different polymer compositions. The thin film composite membrane comprises a thin, dense polymer layer, which is supported by a thicker, porous supporting layer formed separately from the dense layer. For example, the thin, dense layer can have a thickness of about 0.2 micrometers, while the thicker, porous layer has a thickness greater than 0.2 micrometers. Again, the porous support layer can be formed of a composition different than that of the dense layer. As with an asymmetric membrane, the dense layer is responsible for the selective transport properties of the membrane, while the porous supporting layer imparts mechanical integrity and strength.

Whether a thin film composite or asymmetric structure, the reverse osmosis membrane can be mounted in a flat sheet, tubular, spiral wound, hollow fiber, or other like configuration. For example, a flat sheet configuration can include a plurality of the membranes arranged in a plate-and-frame configuration, wherein the membranes are supported by flat, rigid, porous spacer structures.

In the tubular configuration, flat membranes are rolled and joined at a seam, or directly cast in cylindrical form. A porous tube disposed in physical communication with the membrane(s) serves both as the membrane support and the containing vessel in the tubular configuration. The reverse osmosis membrane can be placed on the inside or on the outside of the porous tube through which the wastewater flows. The water permeates the tubular membrane along its entire length, and permeate is collected at the low pressure end of the tube. In one embodiment, a plurality of tubular membrane units can be connected in parallel inside a container module, with manifolds providing connections for the feed, the concentrate, and the permeate streams.

In the spiral wound configuration, a laminated membrane structure is wound around a central, perforated permeate collection tube, and is installed in a standard pipe which serves as the containing vessel. The laminate can consist of two membranes separated by a porous feed spacer and a porous permeate spacer through which the liquids flow. One edge of the laminate is open and in contact with the collection tube. The wastewater flows axially along the module in the channel between the membranes created by the porous feed spacers. The permeate spirals inward to the collection tube along the channel between membranes created by the porous permeate spacer.

In the hollow fiber configuration, fiber ends are embedded in a tube sheet with the fibers either looped or plugged at one end. In one configuration, the wastewater is passed outside the fibers, purified wastewater permeates the fibers, and permeate is collected from the inside bore of the fibers. In another configuration, the wastewater feed is passed inside the fiber bore, and permeate is collected from the outer surface of the fibers.

Regardless of the desired configuration for the membrane, any number of reverse osmosis membranes sufficient to achieve the desired contaminant concentration can be used in the dewatering system. Moreover, one or more of the membranes and/or the membrane container modules can be connected in series or in parallel. For example, the membranes can be a hollow fiber or spiral configuration disposed in a reverse osmosis canister. A plurality of canisters can be used to achieve the desired reduction of contaminants in the waste stream water. The plurality of canisters can be in serial fluid communication, or they can be arranged in parallel arrays of canisters.

Moreover, irrespective of the structure or configuration, the reverse osmosis membrane can be made from any material suitable for dewatering the wastewater stream. Exemplary membrane materials can include, without limitation, cellulose acetate, cellulose nitrate, polyamide, polyethersulfone, or a combination comprising at least one of the foregoing polymers. The reverse osmosis membrane can have a sodium chloride rejection of about 97.5 to about 99.9%.

Permeation of purified wastewater through a reverse osmosis membrane is accomplished under applied pressure. The applied pressure is necessary to counteract osmotic pressure. An osmotic pressure difference exists between two solutions of different concentration separated by a membrane. Osmotic pressure causes the solvent in the more dilute solution to permeate the membrane and flow into the more concentrated solution in order to equalize the two concentrations. Therefore an equal and opposite pressure is required to cause flow of solvent through a membrane in the opposite direction, i.e. from the more dilute solution to the more concentrated solution.

As disclosed herein, the applied or operating pressure is sufficient to cause flow of the contaminants and leaching agents from the dilute purified wastewater to the concentrate stream. An exemplary range of operating pressure for the reverse osmosis dewatering process herein can be about 1 megapascals (MPa) to about 12 MPa. In one embodiment, a high pressure reverse osmosis process can be used, wherein the operating pressure is about 7 MPa to about 12 MPa. The greater the concentration of solute, the greater the osmotic pressure difference between the solution and pure solvent. FIG. 1 is a graph of osmotic pressure versus percent water removal from a concentrated aqueous solution obtained from a fluoride treatment coal cleaning process. The higher the targeted percent water removal from the feed (x-axis), the higher the weight percent solute in the concentrate (right y-axis) and the higher the osmotic pressure of the concentrate (left y-axis). The higher the desired percent water removal, therefore, the higher the pressure applied to the wastewater concentrate. For example, beginning with a wastewater stream having 5 weight percent (wt %) total dissolved solids, removal of 50% of the water by reverse osmosis will form a concentrate having about 10% total dissolved solids. According to FIG. 1, 50 vol % water removal affords a concentrate with an osmotic pressure of about 800 psi, or about 5.5 MPa. Therefore, an applied pressure of at least about 5.5 MPa will be required to remove 50 vol % of the water from the wastewater stream.

Figure 2:
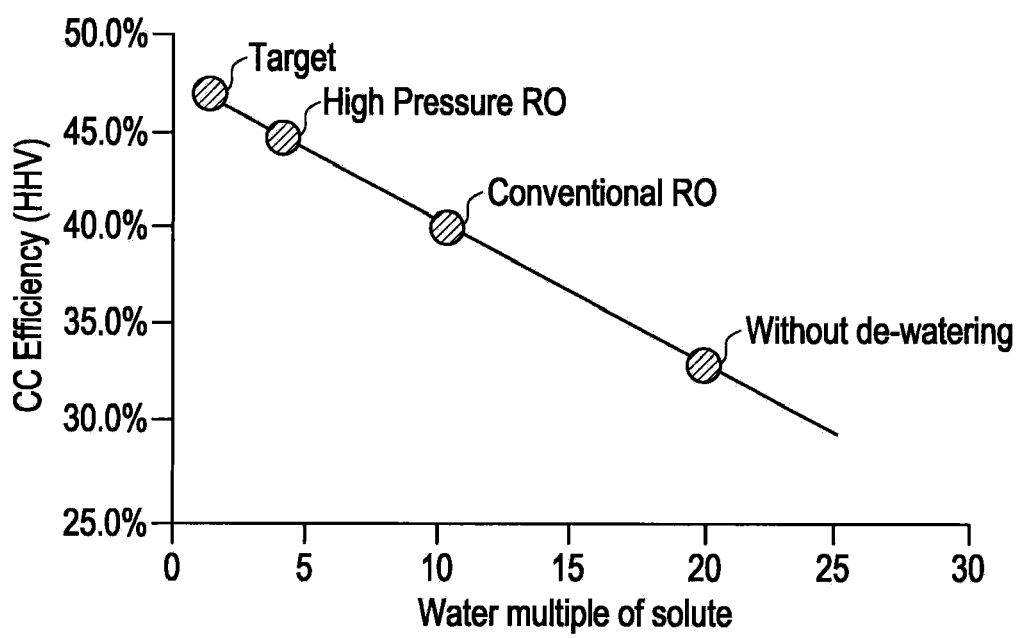
FIG. 2 is a plot of osmotic pressure and weight percent solute versus percent water removal.

Turning now to FIG. 2, a graph is shown of the CC efficiency of a coal turbine power plant process (as measured in units of HHV) versus the water multiple of solute in the wastewater stream. A water multiple of 10 means there are 10 parts water per part contaminant in the wastewater stream. As shown in the figure, wastewater from the fluoride treatment of coal has a total dissolved solids of about 5 wt %, corresponding to a water multiple of solute of about 20 (labeled "without de-watering". As mentioned above, without concentration the solids through reverse osmosis as described herein, the water would have to be boiled off from the wastewater stream. Boiling off the water subtracts from the CC efficiency of the plant. It is estimated that, including the energy required to boil off the water, the CC efficiency of such a coal power plant would be about 33%.

Removal of about 50 vol % of the water from a wastewater stream having about 5 wt % total dissolved solids by the reverse osmosis process described herein will produce a concentrate stream having about 10 wt % total dissolved solids, which corresponds to a water multiple of about 10. This degree of wastewater concentration (i.e., dewatering) can increase the CC efficiency to about 41%, as indicated by the data point labeled "Conventional RO" in FIG. 2.

In another specific embodiment, a high pressure reverse osmosis process, in which the operating pressure is about 7 MPa to about 12 MPa can be used for dewatering. Referring back to FIG. 1, when the operating pressure is increased to about 1600 psi (11 MPa), approximately 80 vol % of the water can be removed, affording a concentrate of about 20 wt % total dissolved solids. Turning again to FIG. 2, this corresponds to a water multiple of solute of about 4. Such a degree of wastewater concentration with high-pressure reverse osmosis can increase the CC efficiency of the plant to about 44%, which corresponds to the data point labeled "High Pressure RO". This level of efficiency results in a coal power plant system with reduced economic and environmental costs. For example, less power is consumed in the reverse osmosis dewatering process than would be used to boil off the water from the wastewater stream.

Figure 3:
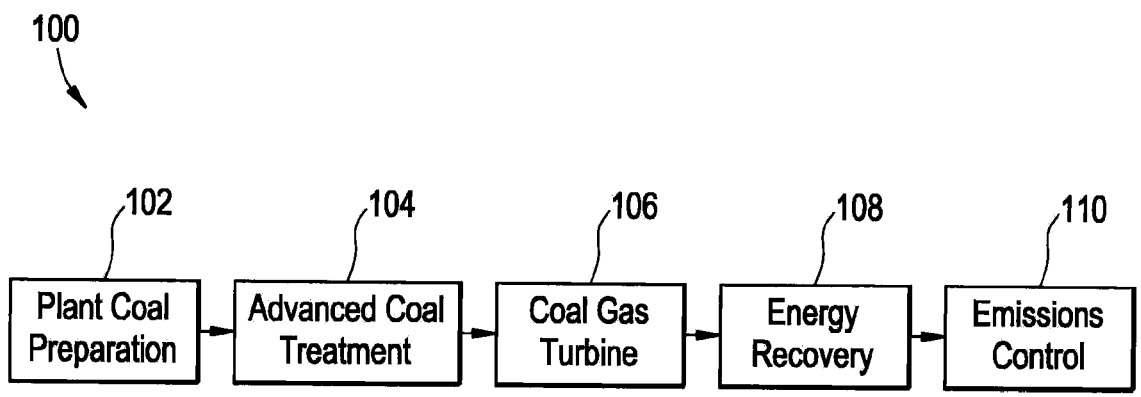
FIG. 3 is a flow diagram of an exemplary embodiment of a coal turbine power plant.

FIG. 3 is a flow diagram illustrating an exemplary embodiment of a coal turbine power plant 100. The coal enters a plant coal preparation stage 102 and then goes to an advanced coal treatment stage 104, before being combusted in the coal gas turbine 106. The coal can go through several preparation and cleaning treatments in order to prepare it for combustion in the turbine. While FIG. 3 has been simplified for convenience, it is to be understood that each stage in the coal turbine power plant 100 can comprise many different components and systems well known to those having skill in the art. For example, in the coal preparation stage 102 the coal can be separated, crushed, pulverized, sized, or the like, prior to being treated in the advanced coal treatment stage 104. Likewise, the advanced coal treatment stage 104 comprises the dewatering system and process described herein, as well as optional components, such as coal flotation for ash removal, centrifuges and dryers for drying the coal, and the like. The clean coal is then sent to the coal gas turbine 106 where it is combusted. The combustion exhaust can be treated in the emissions control stage 110 before the gas is vented to the atmosphere. The emissions control stage 110 can include any components suitable for removing the byproducts of coal combustion from the emissions flue gas. For example, the emissions control stage 110 can include nitrogen oxide reducers, sulfur oxide reducers, particulate matter removal equipment, and the like. Moreover, the coal turbine power plant 100 can further comprises an energy recovery stage disposed between the coal gas turbine 106 and the emissions control stage 110. The energy recover stage 108 can be configured to capture some of the energy present in the turbine exhaust. For example, the energy recovery stage 108 can comprise a heat recovery steam generator (HRSG), which utilizes the heat from the turbine exhaust to generate steam. The HRSG can be operatively coupled to a steam turbine for further power generation, and a condenser to capture the water for recycling.

Figure 4:
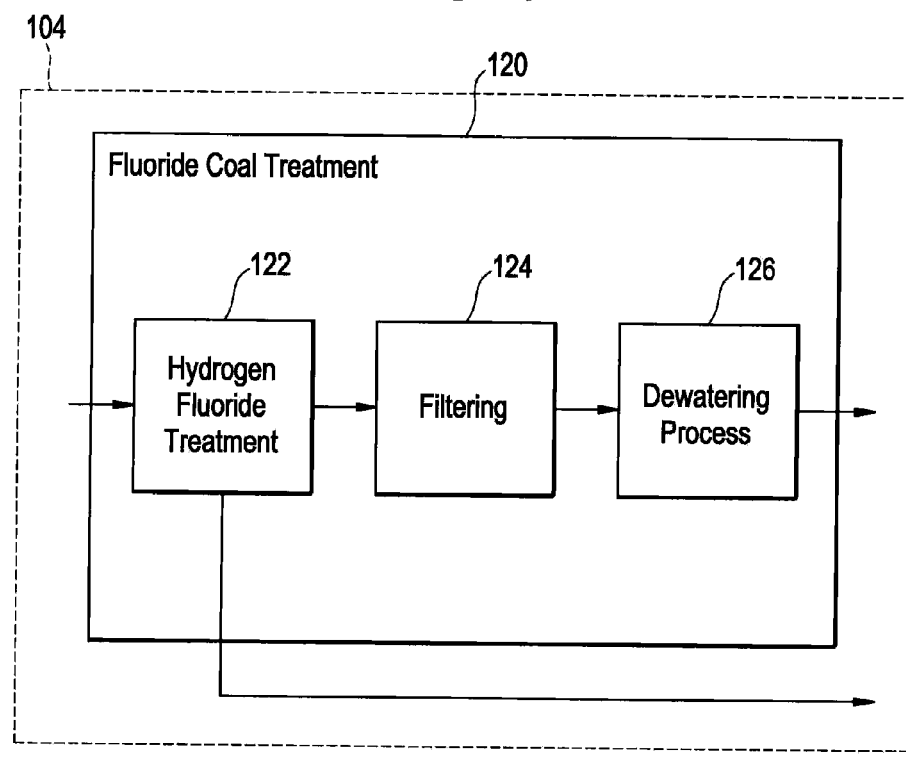
FIG. 4 is a flow diagram of an exemplary embodiment of a fluoride coal treatment system of the coal turbine power plant of FIG. 3.

Turning now to FIG. 4, a more detailed view of the advanced coal treatment stage 104 is illustrated. In this particular embodiment, the advanced coal treatment stage 104 includes a leaching agent coal treatment system 120, which uses hydrogen fluoride as the leaching agent. The fluoride coal treatment system 120 comprises a hydrogen fluoride coal treatment stage 122 in operative communication with a dewatering process stage 126. An optional filtering stage 124 is shown disposed between the fluoride treatment and dewatering stages. As mentioned previously, the minerals in coal impede the combustion of the hydrocarbons and create problems ranging from ash removal to the release of airborne pollutants, e.g., oxides of sulfur, which are present in coal dominantly in two forms, pyritic and organic. Leaching agents are used to remove the minerals from the coal. In this particular embodiment, a hydrofluoric acid (HF) leach treatment is used in combination with the dewatering process. In other embodiments, any leaching agent can be used that is suitable for removing the coal minerals and producing a clean or ultra clean coal.

The coal is subjected to a HF leach to remove the minerals under conditions known in the art. In exemplary embodiments, the HF leach can be carried out with HF at concentrations of about 5 to about 70 wt %, specifically about 15 to about 30 wt %, at temperatures from about 10 degrees Celsius (° C.) to incipient boiling, specifically between about 10° C. to about 40° C., and for a period of time from about ⅙ to about 8 hours, specifically about 2 to about 5 hours. The HF leaching can be co- or counter-current to the coal.

After treatment, a wastewater stream includes the leached out minerals, hydrofluoric acid, water, and other contaminants from the treatment process. The wastewater stream can be passed through a filtration step (124) to remove any solid particles present in the wastewater stream. The filtration unit can include one or more filters selected from cartridge filters, line filters, bag filters, sand filters, multi-media filters, ultrafilters, microfilters, and the like. The filtration unit can remove solids in the wastewater stream so that the wastewater exiting the filtration unit can have, for example, a turbidity below about 3 nephelometric turbidity units (NTU). By reducing the solids in the wastewater, the life of the reverse osmosis membrane can be prolonged because plugging caused by solids is prevented. In one embodiment, the filter contains activated carbon or granular activated carbon, which acts to remove organic compounds that may be in the water. Organic compounds, if not removed, may coat the surface of the reverse osmosis membrane decreasing its life time. The carbon treatment can also protect the reverse osmosis membrane from biologically active components such as fungus or mold, which also can decrease the effectiveness of the reverse osmosis membrane.

Following the hydrofluoric acid treatment and optional filtration, the wastewater steam is processed through reverse osmosis in the dewatering stage 126, which includes at least one membrane. As described above, the water that passes through the membrane is the reverse osmosis permeate. The osmotic pressure of the feed water increases as it is concentrated through each pass of the reverse osmosis unit. The permeate has a reduced concentration of contaminants, and therefore, can be recycled (after optional further cleaning) to various stages of the plant. The concentrate, having increased concentrations of contaminants has now been separated from the water and can be disposed. In some embodiments, it may be possible to regenerate the leaching agent. For example, HF acid regeneration can be accomplished via pyrohydrolysis and sulfation.

The reverse osmosis method described herein can advantageously be applied to wastewater from fluoride treatment of coal despite the low pH, extremely corrosive nature, and high total dissolved solids of the wastewater. Sufficient water is removed from the wastewater by this method so that the CC efficiency of the plant is improved to levels where clean coal turbine power is both economically and environmentally practical.

The terminology used herein is for the purpose of describing particular embodiments only and is not intended to be limiting of the invention. Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise defined, all terms (including technical and scientific terms) used herein have the same meaning as commonly understood by one of ordinary skill in the art to which the embodiments of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A process for treating coal, comprising:
    contacting the coal with a leaching agent configured to remove a mineral from the coal;
    forming a wastewater stream comprising water and a concentration of a contaminant; and
    contacting the wastewater stream with a first side of a reverse osmosis membrane under pressure, wherein a permeate stream comprising a reduced concentration of the contaminant permeates the reverse osmosis membrane and flows from a second side of the reverse osmosis membrane, and a concentrate stream comprising an increased concentration of the contaminant is retained on the first side of the reverse osmosis membrane, wherein forming a wastewater stream comprising water and a concentration of a contaminant is directly followed by contacting the wastewater stream with a first side of a reverse osmosis membrane under pressure, and the permeate stream is supplied to a gas turbine without further treating the coal.

2. The process of claim 1, wherein the contaminant comprises the leaching agent, the mineral, or a combination comprising at least one of the foregoing.

3. The process of claim 1, wherein the leaching agent comprises hydrofluoric acid, fluoride, nitric acid, ferric nitrate, or a combination comprising at least one of the foregoing.

4. The process of claim 1, wherein the mineral comprises silicon, aluminum, iron, titanium, potassium, calcium, sodium, magnesium, barium, strontium, vanadium, copper, manganese, zirconium, zinc, cerium, or a combination comprising at least one of the foregoing.

5. The process of claim 1, wherein the wastewater stream contaminant concentration has a total dissolved solids concentration of about 10,000 mg/L to about 60,000 mg/L.

6. The process of claim 1, wherein the wastewater stream has a pH of about 0 to about 4.

7. The process of claim 3, wherein the permeate stream has a total dissolved solids concentration of about 0.1 mg/L to about 10,000 mg/L.

8. The process of claim 3, wherein the concentrate stream has a total dissolved solids concentration of about 8,000 mg/L to about 500,000 mg/L.

9. The process of claim 4, wherein the permeate stream has a pH of about 4 to about 7.

10. The process of claim 4, wherein the concentrate stream has a pH of about 0 to about 3.

11. The process of claim 1, further comprising removing at least about 50 percent by volume of the water from the wastewater stream.

12. The process of claim 1, wherein the pressure is about 1 MPa to about 12 MPa.

13. The process of claim 1, wherein the pressure is about 7 MPa to about 12 MPa.

14. The process of claim 13, further comprising removing at least about 80 percent by volume of the water from the wastewater stream.

* * * * *